United States Patent [19]

Galbraith, Jr.

[11] 4,000,497
[45] Dec. 28, 1976

[54] CAMERA FILTER POSITIONING APPARATUS

[75] Inventor: Floyd M. Galbraith, Jr., Rochester, N.Y.

[73] Assignee: Eastman Kodak Company, Rochester, N.Y.

[22] Filed: Apr. 10, 1975

[21] Appl. No.: 566,649

[52] U.S. Cl. .................. 354/21; 354/41; 354/42; 354/59

[51] Int. Cl.[2] .......................... G03B 7/08

[58] Field of Search .............. 354/42, 49, 59, 202, 354/21; 352/78 C, 72

[56] References Cited

UNITED STATES PATENTS

| 3,461,782 | 8/1969 | Katsuyama | 354/21 |
| 3,568,581 | 3/1971 | Heinzmann | 352/78 C |
| 3,667,362 | 6/1972 | Neudecker et al. | 354/21 |
| 3,848,985 | 11/1974 | Bennett | 354/21 |

Primary Examiner—L. T. Hix
Assistant Examiner—Alan Mathews
Attorney, Agent, or Firm—J. L. Palmer

[57] ABSTRACT

A camera of the type that receives a film cartridge in a cartridge receptacle and secures the cartridge by a door is provided with apparatus for regulating exposure in response to the combination of (1) sensing a film speed indicator carried by the cartridge and (2) closure of the receptacle door. When a cartridge is inserted into the receptacle and a predetermined film speed indicator is present, an indicator sensing member positions an intermediate lever in a ready position to adjust the exposure regulating apparatus. During closure of the receptacle door, a driver element, located to be engaged and moved when the receptacle door is closed further positions the intermediate lever, which in turn adjusts the exposure regulating apparatus.

3 Claims, 4 Drawing Figures

CAMERA FILTER POSITIONING APPARATUS

BACKGROUND OF THE INVENTION

1. Field of the Invention

The present invention relates to cartridge loading cameras, and more particularly to apparatus for regulating exposure in response to sensing a cartridge film sensitivity code.

2. Description of the Prior Art

Frequently, it is desirable to provide cartridge loading cameras with the capability to expose film having various film speeds. In doing so, it is especially useful to use film speed identification encoded on the film cartridge. The indicator, or code, may be sensed and the exposure regulated to compensate for the variation in film speed. Such code sensing and exposure adjustment eliminates the need for the camera user to separately alter the camera to compensate for different film speeds. It is known to adjust an exposure aperture in response to movement of a locking member of a camera cartridge receptacle door and to use the force provided from the inserted cartridge to adjust the exposure regulating apparatus such as a filter to provide proper exposure. Conventionally, the cameras are constructed so that the cartridge is inserted against a biasing mechanism that may adjust a filter. This bias tends to unseat the cartridge, thereby disturbing the position of the film plane within the camera. This condition may also be aggravated by the fact that movement of the apparatus to adjust the aperture or move the filter may be a greater distance than the available stroke of the cartridge insertion. The unseating force that is exerted on the cartridge is therefore increased by an amount related to the leverage necessary to attain the desired travel of the exposure regulating apparatus.

SUMMARY OF THE INVENTION

Therefore, it is an object of the present invention to provide improved exposure control apparatus in which exposure adjustment is accomplished in response to cartridge film speed code sensing, without affecting film plane positioning.

It is another object of the present invention to provide improved apparatus that uses force derived from closure of a cartridge receptacle door to adjust exposure control apparatus when a cartridge film speed code is present.

In accordance with the present invention, a camera of the type that receives a film cartridge into a camera cartridge receptacle and secures the cartridge by a movable door is provided with apparatus for controlling the position of a camera exposure regulating element in response to the combination of (1) sensing the presence of a predetermined film speed indicator carried by the cartridge and (2) closure of a camera receptacle door. Sensing apparatus, operative against light bias, senses the presence of a film speed indicator on the cartridge and places an intermediate exposure adjusting lever in a ready position to adjust the exposure regulating element. A driver member, located to be engaged and moved by the receptacle door, further positions the lever to move the exposure regulating element to its regulating position.

BRIEF DESCRIPTION OF THE DRAWINGS

The invention and its advantages will become more apparent in the detailed description of the preferred embodiment, presented in conjunction with the accompanying drawing in which.

DESCRIPTION OF THE PREFERRED EMBODIMENT

Because photographic cameras are well known, the present description will be directed in particular to elements forming part of or cooperating more directly with, the present invention, camera elements not specifically shown or described herein being understood to be selectable from those known in the art.

Figure 1:
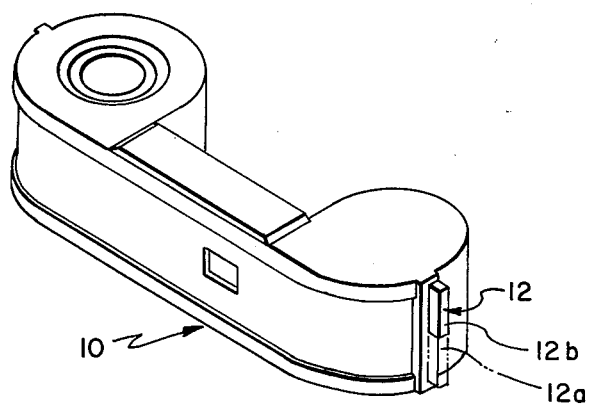
FIG. 1 is a perspective view of a film cartridge including a rib useful as an indicator of speed of the film carried by the cartridge.

First referring to FIG. 1, a cartridge 10 is shown, for illustrative purposes only being of the type known in the prior art for housing 16mm strip film for still cameras. The cartridge 10 carries a rib 12 at one end that has been adapted for use as a code to indicate the speed of the film (ASA rating) carried by the cartridge. To encode the film speed on the cartridge 10, the rib 12 may be made to extend the entire height of the cartridge as shown partly by phantom lines, or portions thereof as shown by solid lines; thus the length of the rib 12 is directly related to the speed if the film carried by the cartridge. For example, a full length rib 12a may indicate the presence of a film speed such as ASA 64, and a shortened or shorter rib 12b indicates the presence of a higher ASA rated film.

Figure 2:
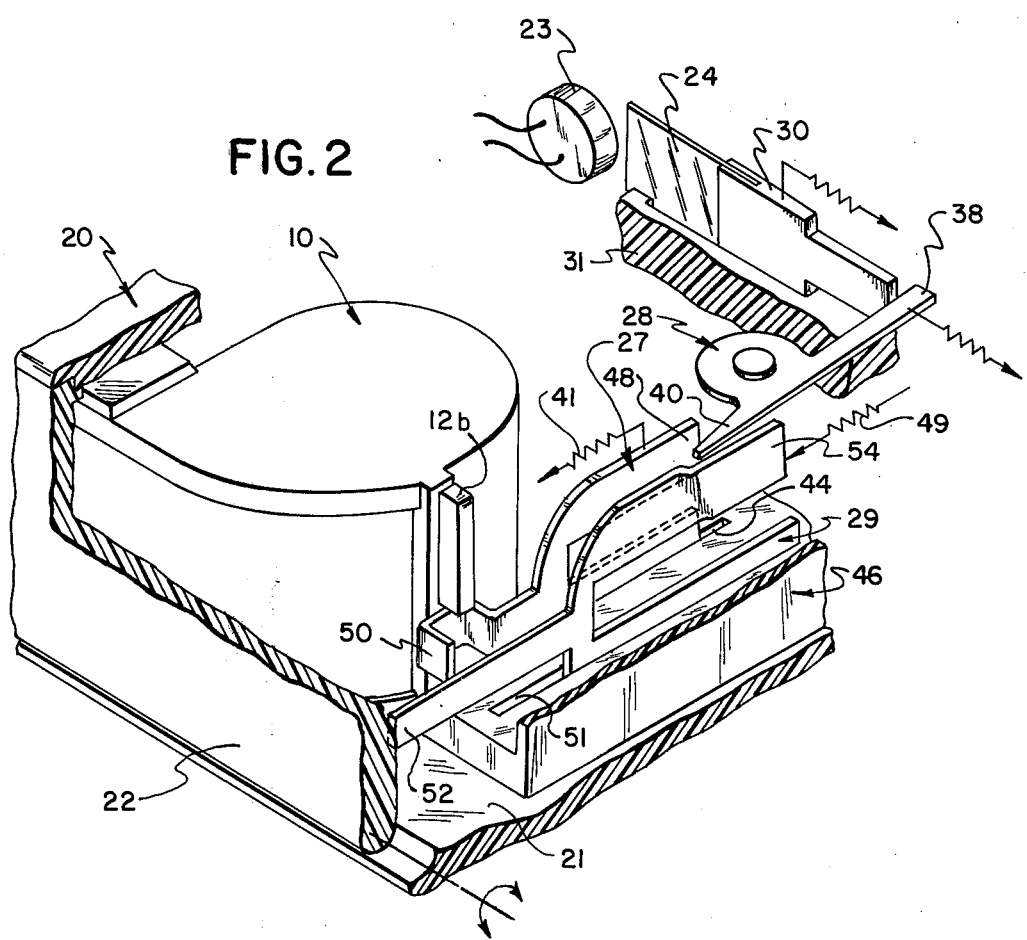
FIG. 2 is a cutaway perspective view of a camera incorporating a preferred embodiment of the present invention, as the apparatus operates with a film cartridge carrying a first ASA rated film.

The cartridge 10 may be utilized in a conventional cartridge loading camera 20, a portion of the interior of which is shown in FIG. 2. Such a camera conventionally includes a cartridge receptacle 21, a receptacle door 22 and may include exposure regulating apparatus, such as for example the apparatus illustrated in U.S. Pat. No. 3,748,974 issued July 31, 1973 to Todd D. Cochran. The exposure regulating apparatus, such as disclosed in the Cochran patent, is responsive to scene brightness and utilizes a photosensitive element 23, which may, for example, be a cadmium sulfide photocell that is fixedly mounted within the camera 20 to receive scene light. Scene light impinging onto the photosensitive element 23 results in exposure regulation to meet scene brightness conditions by (a) variation in the duration of the exposure and/or (b) variation in the size of an exposure aperture. The disclosure in the Cochran patent is incorporated herein by reference.

In keeping with the principal objects of the invention, the exposure of film in the camera may be additionally regulated by a filter 24 that is moved in line with the optical path of the photosensitive element 23 is response to the combination of (a) sensing the presence of predetermined portion of the rib 12 and (b) closure of the receptalce door 22. To position the filter 24 relative to the photosensitive element 23, without relying upon appreciable forces furnished by the stroke of inserting the cartridge 10, a film speed code sensing member 27 prepositions an intermediate lever 28 to engage the filter 24 when a predetermined film speed code is sensed, and a driver element 29, moved by the receptacle door 22, postpositions the lever 28 to move the filter 24 to its active position within the optical path of the photosensitive element 23. In the preferred embodiment of the invention, the filter 24 is mounted to a filter holder 30 that is slidable on a support slide 31, to a position within the optical path of the photosensitive element 23, but is normally biased by a spring 32 to occupy an inactive position out of the optical path.

To interconnect the movement of the filter 24 with the presence of a predetermined code, the lever 28 is rotatably mounted between the filter holder 30 and the code sensing member 27 and driver element 29. It includes a first outwardly extending arm 38 that engages the filter holder 30 and a second oppositely extending arm 40 that is sequentially engageable, first by the code sensing member 27 and second by the driver element 29. The code sensing member 27, in turn, is an elongated member, mounted for lateral movement along a groove 44 of a support member 46 so that one of its ends 48 is engageable with the second arm 40, and the other end 50 extends into the cartridge receptacle 21 to sense the length of the rib 12. A spring 41 biases the code sensing member 27 to a position in which the end 50 protrudes into the receptacle 21 for engagement by the cartridge rib 12. The driver element 29 is also an elongated member that is slidably mounted in a groove 51 of the support 46, parallel to the code sensing member 27, and biased by a spring 53 to a position in which one of its ends 52 extends within the cartridge receptacle 21 and the other of its ends 54 is also positioned adjacent to the second arm 40.

The exposure regulating apparatus that is used with the present invention may conventionally be calibrated to expose a first ASA rated film, in which case the filter 24 is not placed in line with the optical path of the photosensitive element 23. However, when a second, lower ASA rated film is in the camera, the filter 24 is moved into the optical path of the photosensitive element 23. The presence of the filter 24 reduces the scene light striking the photosensitive element 23 and thus, due to the characteristics of the photosensitive element 23, lengthens duration of the exposure to compensate for the slower film speed. Of course the camera exposure aperture could be adjusted to increase the light striking the film rather than reducing the amount of light striking the photosensitive element.

Figure 3:
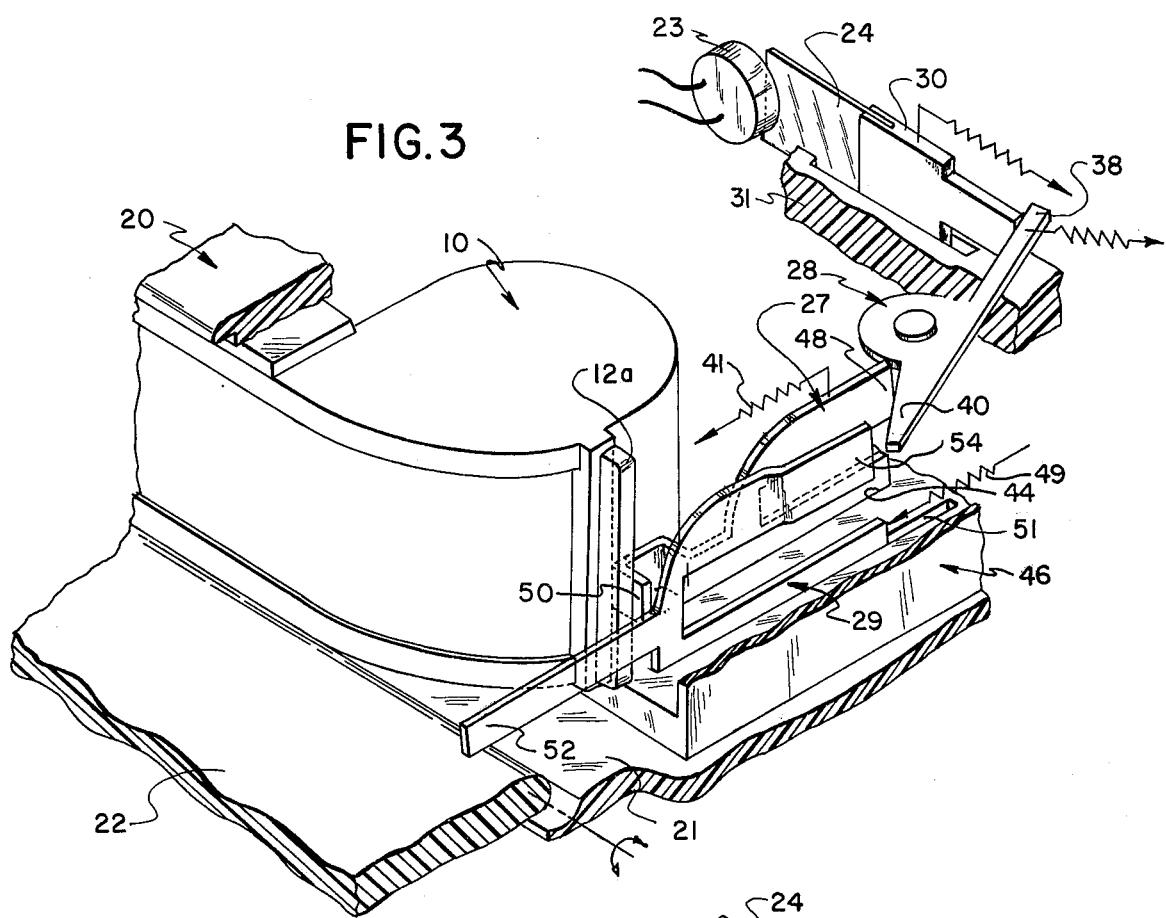
FIG. 3 is a cutaway perspective view of the camera of FIG. 2, as the apparatus operates in the presence of a film cartridge carrying a second ASA rated film, but prior to closure of a cartridge receptacle door.
Figure 4:
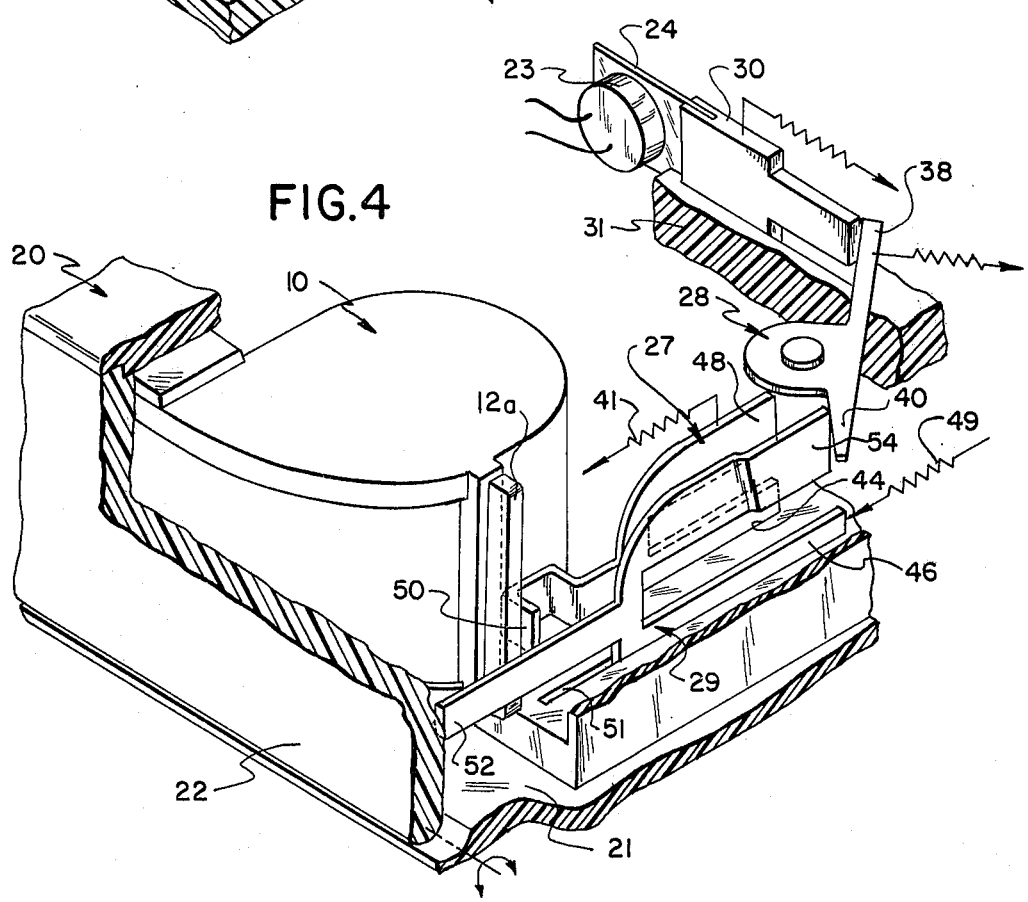
FIG. 4 is a cutaway perspective view of the camera of FIG. 3 after closure of the cartridge receptacle door.

In describing the operation of the apparatus, reference is first made to FIG. 2 which shows the position of the lever 28 in the presence of a film speed code that indicates a higher ASA rated film, for which the filter 24 is not to be positioned in line with the optical path of the photosensitive element 23. In this event, the rib 12 is shortened and, under the bias of the spring 41, the code sensing member 27 remains in the position of FIG. 2 when a cartridge 10 is inserted into the receptacle 23, i.e. a position in which its end 50 protrudes into the cartridge receptacle 21. The code sensing member 27 is not moved so that its end 48 prepositions the lever 28 i.e., the second arm 40 is not rotated to be within the path of travel of the end 52 of the driver element 29. Thus when the receptacle door 22 is closed, the end 52 of the driver element 29 travels past lever 28 but does not engage the second arm 40 to position the filter 24 within the optical path of the photosensitive element 23. When, on the other hand, a cartridge 10 having a full rib 12 is inserted into the receptacle 21 (FIG. 3), the sensing member 27 is engaged by the rib 12 and moved by it against the bias of the spring 41 so that its end 48 engages the second arm 40 to locate the lever 28 in its ready position, i.e., the first arm 38 has moved to engage the filter holder 30, and the second arm 40 is positioned within the path of movement of the driver element 29. When the receptacle door 22 is closed (FIG. 4), it engages the end 50 and moves the driver element 29 until its end 52 engages and moves the second arm 40. The lever 28 is thus moved further rotationally, and the filter 24 is moved to a position within the optical path of photosensitive element 23. The primary force to place and hold the filter 24 in line with the optical path of the photosensitive element 23 is thus furnished by closure of the receptacle door 22 rather than the insertion of the cartridge 10 into the receptacle 21.

The invention has been described in detail with particular reference to a preferred embodiment thereof, but it will be understood that variations and modifications can be effected within the spirit and scope of the invention.

I claim:

1. In a cartridge loading camera having means for securing a cartridge having a code indicative of the speed of film carried thereby, a sensor to sense said code, a filter mounted in said camera for movement between an inactive, non-exposure regulating position and an active, exposure regulating position and filter drive means movable in response to operation of said cartridge securing means, the improvement comprising:
   a member, activatable by said sensor to become cooperative with said drive means to move said filter from said inactive to said active position, said member occupying a first position in cooperative relationship with said sensor in the absence of a predetermined code, in which position said drive means is ineffective to position said filter to said active position upon operation of said cartridge securing means, said member being moved by said sensor, upon sensing said predetermined code, to a position in which, upon operation of said cartridge securing means, said drive means engages and moves said member out of relationship with said sensor and moves said member to position said filter in said active position.

2. Apparatus as recited in claim 1 wherein said member is rotatably mounted between said sensor and said drive means and in the absence of a cartridge carrying said predetermined code, occupies a position out of the path of movement of said drive means.

3. Apparatus as recited in claim 2 wherein said member becomes rotated into the path of movement of said drive means upon said sensor sensing said predetermined code.

* * * * *